Jan. 10, 1933.  L. GOODMAN  1,893,738
GREASE GUN
Filed Dec. 6, 1926
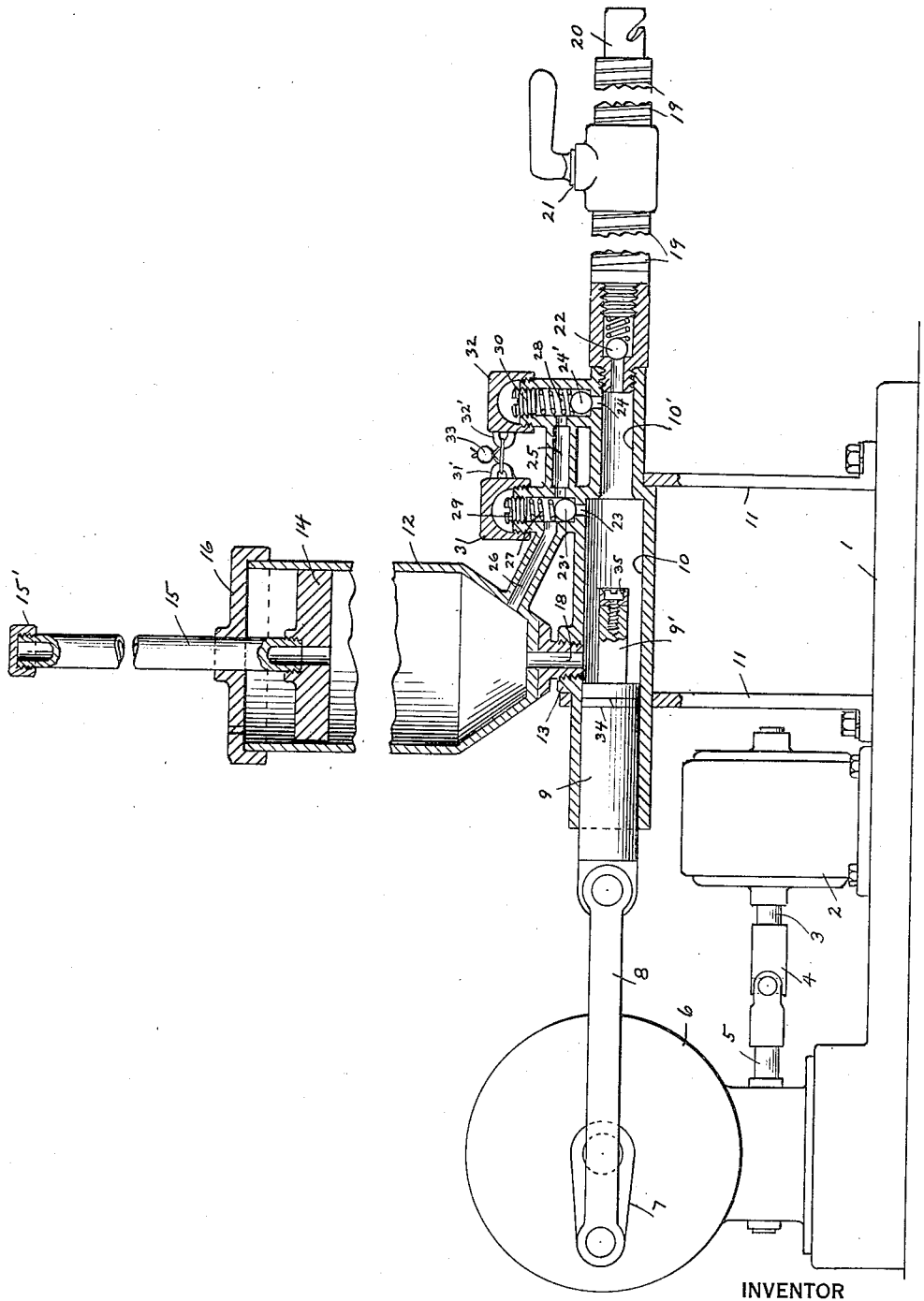
INVENTOR
Louis Goodman
BY Miller & Boyken
His ATTORNEYS Patented Jan. 10, 1933

1,893,738

UNITED STATES PATENT OFFICE

LOUIS GOODMAN, OF SAN FRANCISCO, CALIFORNIA, ASSIGNOR TO STATE HOLDING CO., INC., A CORPORATION OF CALIFORNIA

GREASE GUN

Application filed December 6, 1926. Serial No. 152,959.

This invention relates to grease guns as used for forcing lubricant into bearings generally but particularly automobile bearings provided with fittings for attachment of a pressure grease pipe or hose.

The objects of the invention are to provide apparatus of this kind which may be kept under continuous operation in a garage or the like so that at any time a grease pipe or hose extending therefrom may be connected to a bearing to be lubricated and the lubricant forced therein, also such a device which will always automatically respond with the maximum grease pressure which it is capable of exerting, also such a device which when the hose or pipe is shut off from the bearing will continue to function by keeping the grease or other lubricant circulating under pressure within the apparatus, also such a device which will automatically apply the grease under different pressures to the bearing, one a lower pressure with large volume of grease in a given time, and the other an extremely high pressure and smaller volume, and also such a device which will apply the said different pressures successively to the same bearing so that upon the large volume and lower pressure failing to force a passage into a bearing the very high pressure will follow to force an opening therein, also such a device which upon forcing the bearing with the high pressure will follow with a lower pressure and greater volume of grease. Other objects reside in the particular mechanical construction by which the above objects are carried out, adjusted and maintained as will appear in the following description.

In the drawing accompanying this application I show a simple embodiment of the invention arranged so that all parts of it are visible in one figure tho it will be evident to any mechanic that many other arrangements of the elements may be made while retaining the features to be described. The figure of the drawing is a side elevation of the machine with most of the working parts shown in section so that the relation of the various valves and flow of lubricant through the device may be readily perceived.

In the drawing 1 is a base plate to which a small electric motor 2 is secured and extending from the motor is a drive shaft 3 connected by a universal coupling at 4 to a worm shaft 5 of a speed reducing gear mounted in the casing 6 also secured to the base plate.

Secured to the slow speed shaft of the reducing gear is a crank 7 carrying a pitman 8 pivotally connected to a plunger 9 operative back and forth in a cylinder 10 upon revolution of the crank.

This cylinder 10 is horizontally supported on brackets 11 bolted to the base plate, and vertically positioned above the cylinder is a relatively large cylindrical grease supply container 12 preferably threadedly attached to a boss 13 on the upper side of the plunger cylinder as shown. The grease container 12 is provided with a freely working plunger or piston 14 having a guiding stem 15 preferably hollow as shown and closed by a screw cap 15' at its outer end, and the stem is slidably guided in a large vented cap 16 loosely fitting over the upper end of the container.

The function of the piston 14 is to act as a gravity weight on top of grease or oil within the container cylinder and keep it forced toward the lower port 18 of the container leading into the cylinder 10, and also to prevent the possible formation of air pockets within the grease supply.

Extending axially from the forward end of plunger 9 is a smaller diameter plunger 9' which is aligned to operate in a small cylinder 10' extending axially from the large cylinder 10 and the extreme or discharge end of the smaller cylinder is threaded or otherwise arranged for attaching thereto of a jointed pipe or flexible hose 19 for conveying the lubricant to a bearing, the extreme end of the hose being provided with a high pressure attaching nipple of conventional design as indicated at 20 and back of which is a valve 21 for closing off the line, while at the juncture of the hose or pipe line to the discharge end of the grease pressure cylinder 10' is a spring actuated check valve 22 as indicated.

Adjacent the ends of each of cylinders 10 and 10' are side outlets or ports 23—24 connected by channels 25 and 26 respectively with one another and with the lower portion of the grease container 12, while above each of the side ports are spring relief valves 23' and 24' respectively held closed by springs 27 and 28 each under a predetermined pressure controlled by the adjustment of set screws 29—30 impinging the springs.

Covering these set screws are threaded caps 31—32 provided respectively with wiring lugs 31'—32' which are tied together with a sealing wire and lead seal as indicated at 33 after setting the springs to the desired pressures.

In practice, for automobile lubrication the relief valve 23 (or low pressure valve) is set to give at about 500 pounds per square inch and the valve 24 (or high pressure valve) set for 3000 pounds, so that at these respective pressures they will open and permit any lubricant being forced along the cylinders 10—10' to by-pass back into the grease container if for any reason it cannot find an outlet through the hose 19 into a bearing or if the valve 21 is shut off.

The plungers 9 and 9' are provided with sealing ring 34 or cup leather 35 as indicated and the inner end of cylinder 10' properly chamfered to permit easy entrance of the cup leather.

In operation, a quantity of grease or oil is placed into the container, either by opening the same, or by injecting it through the hollow stem 15 upon removal of its cap 15', the valve 21 is shut off and the motor started which by reason of the worm gear reduction will slowly (preferably about 60 times a minute) reciprocate the plungers 9—9' within their cylinders 10 and 10'.

The large or low pressure plunger 9 travels about twice as far in its cylinder as the small or high pressure plunger 9' does in its cylinder 10' for the reason that the small plunger at the rear end of the stroke is pulled completely out of the small cylinder to the position shown in the drawing, thus at forward stroke the large plunger forces a relatively large amount of grease forward in a given time to be by-passed at 500 lbs. through valve 23' back to the supply container 12 and upon entry of the small plunger 9' in its bore 10' it applies an increased pressure to the grease therein, and upon this pressure reaching 3000 pounds by-passes it through valve 24' back to the supply container 12, consequently keeps up a constant circulation of the grease under these respective pressures through the two cylinders, or bores, as upon return stroke the grease rushes into the large cylinder 10 from the port 18 under influence of the suction generated as well as from pressure of the weight piston 14.

To grease a bearing the nipple 20 is connected to a complementary nipple on the bearing and the valve 21 opened whereupon if the bearing is free, and/or of large capacity the action of plunger 9 will speedily fill it with lubricant, but if the bearing is clogged and will not yield to the 500 pounds pressure of this plunger, the lubricant from the large cylinder 10 will by-pass into the container and then upon each entry of the small plunger 9' into its cylinder 10' the bearing will be subjected to 3000 pounds pressure to force a passage and which when effected will at once be supplied with a larger volume of grease at the lower pressure from plunger 9.

The machine may therefore be in continuous operation ready for instant use for pressure greasing providing a proper hose or pipe 19 capable of withstanding the intermittent 3000 pound pressure and a tight valve at 21 be employed.

It is of course evident that without further illustration several greasing hose or pipe lines may be run from one machine by simple employment of proper branch pipe fittings.

I claim:

1. A lubricant pump provided with large and small diameter aligned cylinders in axial extension, means for supplying lubricant to the large cylinder for ejection from the remote end of the small cylinder, a reciprocable pressure plunger fitting in the large cylinder provided with a smaller plunger extending from the end thereof arranged to fit and operate in the aligned small cylinder, and means for reciprocating the plungers, the stroke of the plungers being such as to cause withdrawal of the small plunger from its cylinder at each backward stroke of the large plunger and a pressure relief by-pass valve on the large cylinder leading to the lubricant supply.

2. A lubricant pump provided with large and small diameter aligned cylinders in axial extension, means for supplying lubricant to the large cylinder for ejection from the remote end of the small cylinder, a reciprocable pressure plunger fitting in the large cylinder provided with a smaller plunger extending from the end thereof arranged to fit and operate in the aligned small cylinder, and means for reciprocating the plungers, the stroke of the plungers being such as to cause withdrawal of the small plunger from its cylinder at each backward stroke of the large plunger and a pressure relief by-pass valve on the large cylinder leading to the lubricant supply and a pressure relief by-pass valve on the small cylinder leading to the lubricant supply.

3. In a lubricating device, in combination, a chamber for containing a lubricant, a cylinder having two axially connected portions and communicating with said chamber, said cylinder having a valve controlled outlet, pistons operable in one direction in the complemental portions of said cylinder for creating suction therein for drawing contents of the chamber into said cylinder, a bleed from said cylinder to said chamber one of said pistons closing communication between the cylinder portions when moved a predetermined distance in another direction to expel the contents of one of said cylinder portions.

4. In a lubricating device, in combination, a chamber for containing a lubricant, a cylinder having two axially connected portions and communicating with said chamber, said cylinder having a valve controlled outlet, pistons operable in one direction in said cylinder for creating suction therein for drawing contents of the chamber into said cylinder, one of said pistons closing communication between the cylinder portions when moved a predetermined distance in another direction to expel the contents of one of said cylinder portions, and a valve controlled bleed in one of said cylinder portions at a point near the connection between said cylinders.

LOUIS GOODMAN.